(12) United States Patent
Conway et al.

(10) Patent No.: US 11,459,939 B2
(45) Date of Patent: Oct. 4, 2022

(54) INTERNAL COMBUSTION ENGINE WITH COOLING ASSIST SYSTEM FOR MANIFOLD INTAKE TEMPERATURE REDUCTION

(71) Applicant: Southwest Research Institute, San Antonio, TX (US)

(72) Inventors: Graham T Conway, San Antonio, TX (US); Andre Swarts, Helotes, TX (US); Robert Mitchell, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 17/160,510

(22) Filed: Jan. 28, 2021

(65) Prior Publication Data
US 2022/0235717 A1 Jul. 28, 2022

(51) Int. Cl.
*F02B 29/04* (2006.01)
*F02B 33/44* (2006.01)
*F02B 37/00* (2006.01)

(52) U.S. Cl.
CPC ............. *F02B 29/04* (2013.01); *F02B 33/44* (2013.01); *F02B 37/00* (2013.01)

(58) Field of Classification Search
CPC ........... F02B 33/44; F02B 37/00; F02B 29/04
See application file for complete search history.

(56) References Cited

U.S. PATENT DOCUMENTS

| | | | | |
|---|---|---|---|---|
| 10,801,399 B2 * | 10/2020 | Kotani | ................... | F02D 29/02 |
| 2012/0210952 A1 * | 8/2012 | Reuss | ................... | B60K 6/485 |
| | | | | 123/542 |
| 2013/0098031 A1 * | 4/2013 | Petrovic | ................. | F02B 41/00 |
| | | | | 60/599 |
| 2014/0230430 A1 * | 8/2014 | Krug | ....................... | F02B 37/16 |
| | | | | 60/273 |
| 2015/0361869 A1 * | 12/2015 | Hotta | .................. | F02B 29/0493 |
| | | | | 123/559.1 |
| 2016/0195047 A1 * | 7/2016 | Carter | .................... | F02M 31/20 |
| | | | | 60/605.1 |

FOREIGN PATENT DOCUMENTS

| | | | | |
|---|---|---|---|---|
| DE | 202015102248 U1 * | 6/2015 | .......... | F02B 29/0412 |
| GB | 2420152 A * | 5/2006 | ............. | F02B 33/44 |
| JP | 05079334 A * | 3/1993 | | |
| JP | 2759375 B2 * | 5/1998 | | |

* cited by examiner

*Primary Examiner* — Ngoc T Nguyen
(74) *Attorney, Agent, or Firm* — Livingston Law Firm

(57) ABSTRACT

Methods and systems for reducing the temperature of the charge air provided to a turbocharged internal combustion engine. A supercharger is installed on the air intake path, upstream the turbocharger's compressor. A secondary charge air cooler is installed between the supercharger and the main compressor. This over-compresses the intake air, so that an expansion turbine installed downstream the turbocharger's compressor can cool the charge air and still provide sufficient charge air pressure into the intake manifold.

7 Claims, 2 Drawing Sheets

INTERNAL COMBUSTION ENGINE WITH COOLING ASSIST SYSTEM FOR MANIFOLD INTAKE TEMPERATURE REDUCTION

TECHNICAL FIELD OF THE INVENTION

This invention relates to internal combustion engine vehicles (or hybrid vehicles) having turbochargers, and more particularly to cooling the charge air for such engines.

BACKGROUND OF THE INVENTION

In modern internal combustion engines, it is important to ensure the temperature of the charge air does not become excessive. Excessive temperatures can lead to reduced charge density and higher combustion temperatures which can affect torque, power and emissions. A cooler airflow is a denser air flow, which provides a more efficient combustion cycle.

In boosted internal combustion engines, excessive heat in the charge air is a possibility. Although turbochargers and superchargers increase charge air density, they also increase the temperature of the air into the engine's intake manifold. A common way to achieve cooling the charge air is the use of a heat exchanger as the charge air leaves the compressor. Such a heat exchanger is referred to synonymously as a charge air cooler (CAC), intercooler, or aftercooler. Increasing demand for improvements in fuel economy and exhaust emissions has made the charge air cooler an important component of most modern forced intake engines.

However, reduction of the intake air temperature with a charge air cooler is limited by the cooling medium temperature of the charge air cooler. The cooling medium is either ambient air or engine coolant. Reduction of intake air temperature is also limited by the efficiency of the charge air cooler.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to reducing manifold air temperature (MAT) of an internal combustion engine of a vehicle. The intake charge air is over-expanded using an expansion turbine. In addition to the expansion turbine, which is installed in front of the intake manifold, an electrical supercharger and a second charge air cooler are installed before a conventional turbocharger.

One advantage of the MAT cooling system and method described herein is reduction of knock. Reduced knock can lead to increased engine efficiency by better combustion phasing or increased compression ratios. A further advantage is that MAT cooling can lead to lower exhaust temperatures. These results can minimize or eliminate the need for fuel enrichment. Elimination of fuel enrichment can allow for stoichiometric operation over a wider speed-load range and can be beneficial for sizing of exhaust aftertreatment devices. MAT cooling can also directly increase efficiency by increasing air density, reducing pumping losses, and improving volumetric efficiency.

Figure 1:
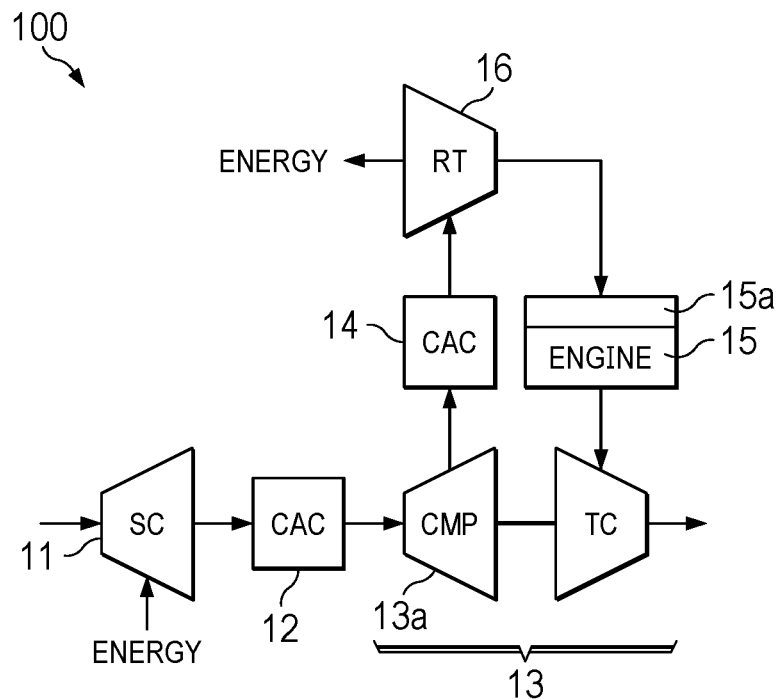
FIG. 1 illustrates a turbocharged engine and a manifold temperature reduction system in accordance with the invention.

FIG. 1 illustrates a MAT cooling assist system 100 in accordance with the invention. Internal combustion engine 15 has a turbocharger 13 and main charge air cooler 14. Both turbocharger 13 and main charge air cooler 14 may be conventionally installed and operated except with the modifications described herein. Pressurized and cooled intake air enters engine 15 via the engine's intake manifold 15a.

System 100 comprises the installation of an electrical supercharger 11 and secondary charge air cooler 12 upstream of the compressor 13a of turbocharger 13. In addition, an expansion turbine 16 is installed between the engine's main charge air cooler 14 and intake manifold 15a.

The operation of system 100 is based on over-expansion of intake air by expansion turbine 16 immediately prior to entering intake manifold 15a. Expansion turbine 16 may be any turbine device that cools air by expanding it. Expansion turbine 16 receives over-pressurized air and cooled air from compressor 13a and charge air cooler 14, which drives turbine 16 to expand the air to the pressure required for engine 15. This expansion results in cooler air at the proper pressure into the intake manifold 15a.

To ensure that the charge air into intake manifold 15a has sufficient pressure, the over-compression is performed on the intake air entering compressor 13a of turbocharger 13. This over-compression is achieved with supercharger 11 (an electrically driven compressor) and secondary charge air cooler 12.

Figure 2:
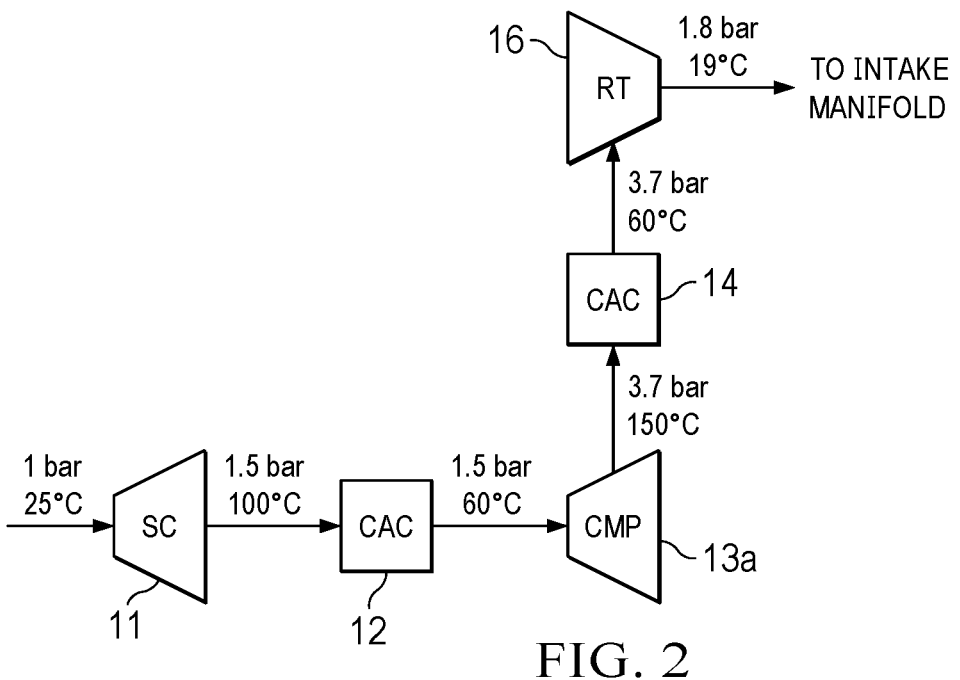
FIG. 2 illustrates an example of temperatures and pressures along the air intake path of the system of FIG. 1.

FIG. 2 illustrates an example of temperatures and pressures along the air intake path of system 100. It is assumed that system 100 is operating at full load and is a 2-liter turbocharged engine 15. The inlet air temperature is 1 bar at 25 degrees C. The combination of supercharger 11 and charge air cooler 12 deliver "over-compressed" air to the compressor 13a at 1.5 bar and 60 degrees C. The combination of compressor 13a and charge air cooler 14 deliver air to the expansion turbine at 3.7 bar and 60 degrees C. The turbine 16 "over-expands" the air to 1.8 bar and 19 degrees C., which is the charge air delivered to the intake manifold 15a.

Despite the energy requirements for the over-compression, system 100 is expected to provide net positive engine efficiency. Referring again to FIG. 1, expansion turbine 16 produces electricity, which may be used to drive a motor-driven compressor rather than an engine-driven supercharger 11.

If engine 15 is part of a hybrid-electric vehicle, the electrical energy of system 100 can be integrated into that architecture. The energy consumption of supercharger 11 and expansion turbine 16 may be coupled or decoupled. Decoupling may provide efficiency improvements. This may provide further efficiency improvements by redirecting the energy to or from the tractive effort, to allow either the supercharger 11 or expansion turbine 16 to operate in a more efficient manner, or to minimize transient inefficiency by load smoothing.

Figure 3:
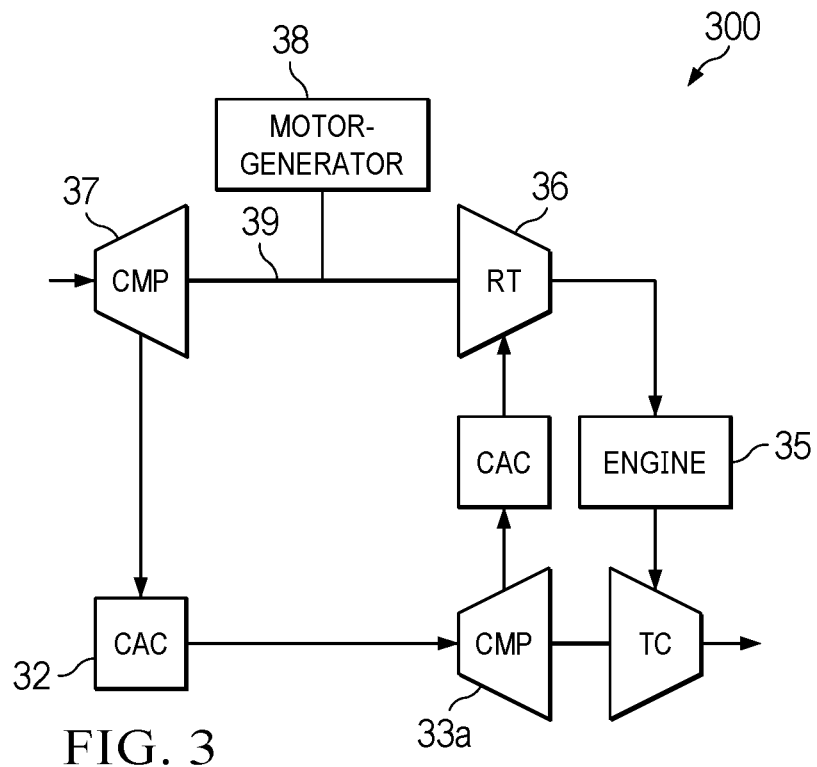
FIG. 3 illustrates the manifold temperature reduction system with a mechanical coupling between the expansion turbine and the supercharger.

FIG. 3 illustrates another embodiment of the MAT cooling system, a system 300 that has a mechanical coupling 39 between the expansion turbine 36 and a compressor 37. Compressor 37 is electric driven and may be decoupled from the engine. A clutchable connection may be made to an electrical motor-generator 38.

Figure 4:
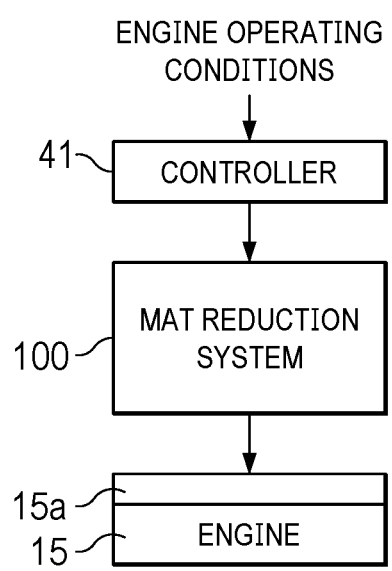
FIG. 4 illustrates a method of using the manifold temperature reduction system for reducing temperature of the charge air.

FIG. 4 illustrates a method of reducing MAT of an internal combustion vehicle, using system 100 or 300. A controller 41 receives data from various engine sensors that represent the vehicle's current operating conditions. This data provides controller 41 with the vehicle's manifold intake temperature and may be provide by an intake manifold temperature sensor.

The temperature data is used by controller 41 to determine if the MAT is above a desired threshold. If so, the intake air is deemed to be "too warm" and system 100 is activated. Supercharger 11 and expansion turbine 16 are activated, and as described above, provide a further reduction in the charge air temperature than would be accomplished by the main charge air cooler 14 alone.

What is claimed is:

1. An improved air charge system for an internal combustion engine, the engine having an intake manifold for receiving the charge air via an air intake path, the engine further having a turbocharger with a turbine-driven compressor and main charge air cooler, the improvements comprising:
   a motor-driven compressor on the air intake path, upstream the turbine-driven compressor;
   a charge air cooler on the air intake path, between the motor-driven compressor and the turbine-driven compressor; and
   an expansion turbine on the air intake path downstream the turbine-driven compressor;
   wherein the expansion turbine is mechanically coupled to the motor-driven compressor.

2. The system of claim 1, wherein the engine is part of an electric-hybrid engine system.

3. The system of claim 1, further comprising a controller operable to receive data representing the manifold air temperature (MAT), to determine if the MAT is above a desired threshold, and to activate the motor-driven compressor and expansion turbine if the MAT is above the desired threshold.

4. A method of reducing the temperature of the intake air provided to an internal combustion engine's intake manifold via an air intake path, the engine having an engine system with a turbocharger with a turbine-driven compressor and with a main charge air cooler downstream the turbine-driven compressor, and further having a motor-generator, comprising:
   providing a motor-driven compressor on the air intake path, upstream the turbine-driven compressor;
   providing a secondary charge air cooler on the air intake path, between the motor-driven compressor and the turbine-driven compressor; and
   providing an expansion turbine on the air intake path downstream the turbine-driven compressor;
   mechanically coupling the motor-driven compressor to the expansion turbine such that the expansion turbine provides energy to the motor-driven compressor; and
   activating the motor-driven compressor, secondary charge air cooler, and expansion turbine such that the motor-driven compressor compresses the intake air above a pressure desired for intake to the intake manifold and the expansion turbine cools the intake air into the intake manifold to a temperature that is cooler than when the motor-driven compressor, secondary charge air cooler, and expansion turbine are not activated.

5. The method of claim 4, wherein the motor-driven compressor is mechanically coupled to the expansion turbine including a clutchable connection to the motor-generator.

6. The method of claim 4, wherein the engine is part of an electric-hybrid engine system.

7. The method of claim 4, further comprising measuring the manifold air temperature (MAT), determining if the MAT is above a desired threshold, and performing the activating step if the MAT is above the desired threshold.

* * * * *